United States Patent [19]

Jänicke et al.

[11] 4,350,864
[45] Sep. 21, 1982

[54] TRAVELING WIRE EDM APPARATUS WITH AUTOMATIC WIRE RETHREADING MECHANISM

[75] Inventors: Johann Jänicke, La Chapelle Rambaud, France; Roger Girardin, Vernier, Switzerland

[73] Assignee: Ateliers des Charmilles, S.A., Geneva, Switzerland

[21] Appl. No.: 158,914

[22] Filed: Jun. 12, 1980

[30] Foreign Application Priority Data

Jun. 21, 1979 [CH] Switzerland ................ 5800/79

[51] Int. Cl.³ .............................................. B23P 1/12
[52] U.S. Cl. ............................ 219/69 W; 219/69 M
[58] Field of Search ............. 219/69 M, 69 W, 69 S, 219/69 C; 83/926 B, 884

[56] References Cited

U.S. PATENT DOCUMENTS

| | | | |
|---|---|---|---|
| 3,636,296 | 1/1972 | Semin | 219/69 W |
| 3,891,819 | 6/1975 | Ullmann et al. | 219/69 W |
| 3,987,270 | 10/1976 | Ullmann et al. | 219/69 W |
| 4,205,212 | 5/1980 | Ullmann et al. | 219/69 W |
| 4,242,558 | 12/1980 | Kunze | 219/69 W |
| 4,242,559 | 12/1980 | Roemer et al. | 219/69 W |

FOREIGN PATENT DOCUMENTS 51-15897 2/1976 Japan ................ 219/69 W

*Primary Examiner*—B. A. Reynolds
*Assistant Examiner*—M. H. Paschall
*Attorney, Agent, or Firm*—Hauke and Patalidis

[57] ABSTRACT

An automatic wire rethreading mechanism for traveling wire EDM apparatus wherein the workpiece is cut by electrical discharges by an electrode in the form of a wire, comprising a mechanism for automatically threading the electrode wire through a pre-drilled hole in the workpiece, the automatic wire threading mechanism being adapted to thread the wire at the beginning of a cutting operation and any time the electrode wire is ruptured in the course of a cutting operation. The position of the pre-drilled hole is memorized, as well as the relative position of the wire and workpiece at the instant of wire rupture. The workpiece and the electrode wire holders are returned to their start position along a predetermined path and, after threading the wire again through the pre-drilled hole, the electrode wire and the workpiece are displaced relative to each other, without applying electrical discharges between the electrodes, along the already cut path until the wire electrode and the workpiece are positioned relative to each other in the same position as occupied when the electrode wire ruptured.

6 Claims, 1 Drawing Figure

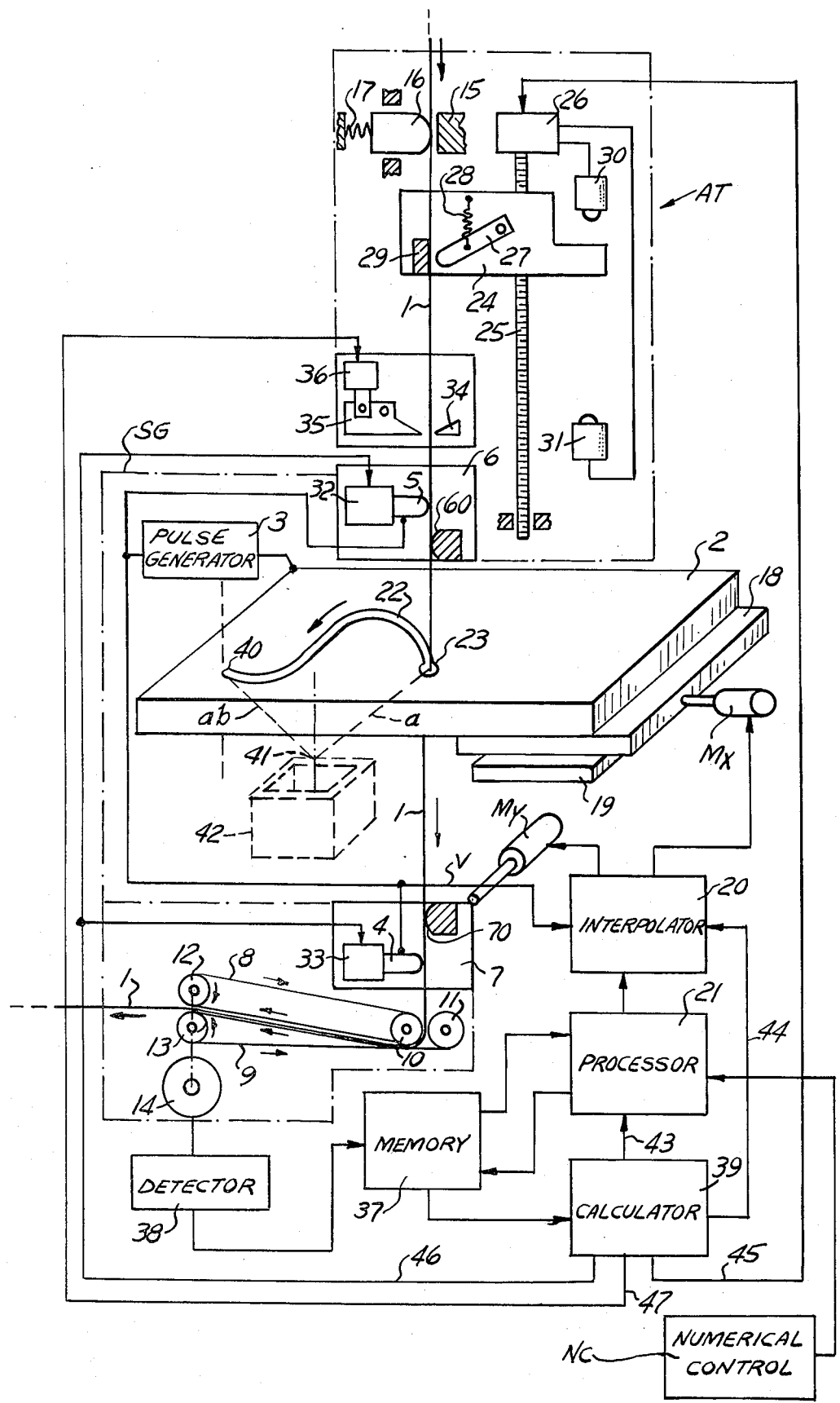

TRAVELING WIRE EDM APPARATUS WITH AUTOMATIC WIRE RETHREADING MECHANISM

BACKGROUND OF THE INVENTION

The present invention relates to an EDM apparatus wherein the electrode workpiece is cut by electrical discharges by means of an electrode tool in the form of a longitudinally traveling wire, and more particularly to a traveling wire EDM apparatus provided with means for threading the free end of the electrode wire through a hole pre-drilled in the workpiece, and for capturing the end of the wire passed through the pre-drilled hole by the feeding mechanism feeding the wire longitudinally through the machining zone.

Such an arrangement, as provided by the present invention, for automatically threading a wire electrode does away with one of the most difficult manual operations required in traveling wire EDM apparatus prior to effecting a cut through the workpiece. In view of the very small diameter of the wire and of the thermic and mechanical stresses exerted on the wire during a cutting operation, rupture of the wire may occur at any point of the cutting path. However, when the wire ruptures, the slit cut in the workpiece is too narrow to permit automatic rethread of the wire electrode at the point of rupture by means of the automatic rethreading mechanism used for effecting the original threading of the electrode wire through the pre-drilled hole, and the machine operator must intervene to manually effect the rethreading operation. Consequently, the EDM apparatus must be continuously monitored by the machine operator.

SUMMARY OF THE INVENTION

The present invention has for principal object to eliminate entirely the necessity for the machine operator to cotinuously watch the EDM apparatus, and provides automatic means for rethreading the electrode wire following a rupture of the wire at any time during a cutting operation. The apparatus of the invention is provided with a memory unit for storing the relative position of the electrode wire and of the workpiece, first with respect to the initial threading of the electrode wire through the pre-drilled hole in the workpiece and secondly with respect to the location of the relative position of the electrodes at the time the electrode wire breaks in the course of a cutting pass. Additionally, the apparatus of the invention is provided with a stored numerical control program for returning the workpiece and the electrode wire support members to the initial location of wire threading through the pre-drilled hole, after detecting rupture of the wire, by following a predetermined return path, for providing appropriate command signals for rethreading the electrode wire through the pre-drilled hole, and for displacing the electrode wire and the workpiece relative to each other along the already cut path, without effecting any machining until the relative position of the electrode wire and of the workpiece coincides with the position at which the electrode wire had previously ruptured.

In this manner, it is possible to increase substantially the working time of a traveling wire EDM apparatus and the financial return on the invested capital without the necessity of a machine operator continuously watching over the apparatus and, for example, it is possible to utilize the apparatus continuously without surveillance, even during off-shift non working hours.

A better understanding of the present invention will be obtained by those skilled in the art when the following description of an example of the best mode contemplated for practicing the invention is read in conjunction with the accompanying drawing wherein:

BRIEF DESCRIPTION OF THE DRAWING

The single FIGURE in the drawing illustrates, in a schematic block diagram manner, an example of a traveling wire EDM machine according to the present invention.

DETAILED DESCRIPTION OF THE PREFERRED EMBODIMENT

The traveling wire EDM apparatus schematically illustrated in the drawing comprises an electrode tool in the form of a metallic wire 1 and an electrode workpiece 2 between which are applied electrical voltage pulses triggering electro-erosive current discharges. The voltage pulses are obtained from a pulse generator 3 having a terminal connected to the workpiece 2, and another terminal connected to the electrode wire 1 through appropriate retractable contact fingers 4 and 5 disposed one on one side of the workpiece and the other on the other side or, as illustrated, one below the workpiece 2 and the other above the workpiece 2.

The wire 1 is held in a predetermined position by means of an upper guiding device 6 and of a lower guiding device 7 between which the wire 1 is axially displaced in the direction of the arrows, by sliding over the guiding surfaces 60 and 70, and by being pulled as a result of being pinched between two conveyor bands 8 and 9. The conveyor band 8 is supported by rolls or pulleys 10 and 12, while the conveyor band 9 is supported by the rolls or pulleys 11 and 13. The rolls or pulleys 11 and 13 are driven, for example, by an electric motor 14. The wire 1 is held under traction by means of a mechanical brake comprising a friction surface 15 and a plunger 16 between which the wire is squeezed under the pressure imparted to the plunger 16 by a spring 17. The workpiece 2 is mounted on a table 18 displaced along one of two coordinate axes, for example along the X-axis, relative to a stationary support 19 by a servo motor Mx. The wire support and guide members 6 and 7, which are interconnected for displacement in unison by an appropriate support member arbitrarily represented by the phantom line SG, are displaced simultaneously along another coordinate axis, the Y-axis for example, by a servo motor My. The servo motors Mx and My are controlled according to an appropriate program by a conventional numerical control system NC comprising an interpolator 20 receiving information data from an appropriate calculator or processor circuit 21 such as to develop an appropriate cutting path trajectory 22 for the electrode wire 1 into the workpiece, starting from a hole 23 pre-drilled in the workpiece 2. The speed at which the interpolator 20 develops the point by point coordinates of the cutting path 22 is controlled as a function of the machining voltage across the terminals of the pulse generator 3, as appearing on a line V, such as to maintain a predetermined electrical discharge gap between the advancing side of the wire 1 and the corresponding receding trailing edge surface of the cut in the workpiece 2, in the course of a cutting operation.

The step of threading the end of the electrode wire 1 through the pre-drilled hole 23 is accomplished, prior to effecting a cut through the workpiece 2, by means of an automatic threading mechanism AT comprising a movable carriage 24 displaceable in a direction parallel to the wire 1 by way of a jack screw 25 driven by an electric motor 26. The movable carriage 24 is provided with a lever 27 held in contact at one end with the wire 1 by a spring 28 and arranged to pinch the wire 1 between the end of the lever 27 and the face of a support member 29 as long as the velocity of displacement of the carriage 24 is higher than the velocity of longitudinal displacement of the wire 1, and arranged to let the wire 1 move freely between the end of the lever 27 and the face of the support member 29 when the velocity of displacement of the wire 1 is higher than the velocity of displacement of the carriage 24. The length of travel, or stroke, of the carriage 24 is limited by appropriate limit switches 30 and 31 operating the motor 26.

The automatic wire threading mechanism AT further comprises a pair of servo motors 32 and 33 adapted to displace the end of the contact fingers 4 and 5 away from the wire 1 prior to feeding the end of the wire 1 through the pre-drilled hole 23. In addition, the automatic threading mechanism comprises an automatic wire cut-off device comprising a stationary knife blade 34 and a movable knife blade 35 displaced by a servo motor 36.

The control system for rethreading the wire 1 in the event of rupture comprises a memory unit 37 co-operating with the calculator or processor unit 21 such as to store in the memory 37 data representing the position of the wire 1 relative to the workpiece 2 when the initial threading operation of the wire through the pre-drilled hole 23 is effected and, subsequently, to store additional data representing the relative position of the wire 1 and of the workpiece 2 when the wire 1 ruptures in the course of a cutting operation. Storage of the additional data in the memory 37 is controlled by a detection circuit 38 connected to the servo motor 14 such as to detect a decrease in the load torque of the motor 14 upon rupture of the electrode wire 1 and to command the storing into the memory 37 of the data representing the relative position of the wire 1 and the workpiece 2 when such a decrease of the load on the motor 14 is detected.

That position numerical data, stored in the memory 37, is then transferred from the memory 37 into a calculator unit 39 which determines the return path for the relative displacement of the wire support and guide members 6-7 and the workpiece 2 from the position of wire rupture, arbitrarily designated at 40, to the start position corresponding to the pre-drilled hole 23 in the workpiece 2. The appropriate return path is determined by the calculator 39 such as to pass through a predetermined relative position, arbitrarily designated at 41, placing the end of the wire 1 outside from above the area of the workpiece 2 and directly above a receptacle 42, such as to enable the end of the wire 1 cut off by the cut-off mechanism comprising the cut-off blades 35 and 34 to fall into the receptacle. The calculator 39 supplies appropriate information data to the interpolator 20 and to the processor 21 and appropriate pulses to the servo motors 26, 32, 33 and 36 respectively through lines 43, 44, 45, 46 and 47.

The apparatus schematically illustrated in the drawing function as follows:

Rupture of the electrode wire 1 in the course of a machining operation is detected by the detector 38 which then commands the memory 37 to store the relative position of the electrode wire 1 and of the workpiece 2 when rupture of the wire is detected, as represented by the position X- and Y-axis coordinates of the point 40 at which the cut 22 in the workpiece 2 was interrupted as a result of the rupture of the wire 1. Simultaneously, the numerical control unit NC is stopped and the position coordinates stored in the memory 37 are transferred to the calculator 39 which, based on the received information data determines the appropriate paths a and ab of return to the position of the pre-drilled hole 23, passing through the wire trimming particular position 41. This information is supplied by the calculator 39 to the interpolator 20 in order to effectuate the return motion by means of the servo motors My and Mx as controlled by the interpolator 20. When the particular position 41 is reached, the calculator 39 supplies on line 46 a first signal commanding the servo motors 32 and 33 to retract the contact fingers 4 and 5, and on line 47 a second signal commanding the servo motor 36 to operate the movable knife blade 35 to cut off the end of the wire 1.

Subsequently, the relative motion of the wire 1 and of the workpiece 2 is continued from the wire trimming particular position 41 to the relative position of the pre-drilled hole 23 along the path ab. When the relative position of the pre-drilled hole 23 is reached, the calculator 39 provides a third signal, via line 45, which activates the servo motor 26 rotating the screw jack 25 in the appropriate direction for driving the carriage 24 downwardly, thus threading the electrode wire 1 through the pre-drilled hole 23 in the workpiece 2 until the end of the wire is engaged between the rolls or pulleys 10 and 11 and fed between the drive conveyor bands 8 and 9, such as to exert a traction on the end of the wire 1 and feed the wire axially. The load sensor or detector 38, upon detecting a load torque applied on the wire feed drive motor 14, commands the processor 21 to control the interpolator 20 to repeat the appropriate relative displacement of the electrode wire 1 and the workpiece 2 causing the electrode wire 1 to be displaced relative to the workpiece 2 along the previously cut path 22 in the workpiece 2 from the position of the pre-drilled hole 23 to the position 40 at which the wire 1 had previously ruptured, and to erase from the memory 37 the coordinates of the point of rupture together with the coordinates of the return path portion a to the wire trimming position 41. The coordinates of the path portion ab remain stored in the memory 37 for future use in the event of another breakage of the electrode wire. Simultaneously the calculator 39, through line 46, commands the servo motors 32 and 33 to extend the contact fingers 4 and 5 back to their original position, such as to re-establish contact with the electrode wire 1 for re-connecting the electrode wire 1 to the output of the pulse generator 3, so as to continue the machining out. Simultaneously with the electrode wire 1 having been engaged by the conveyor bands 8 and 9 and the carriage 24 having reached the end of its downward travel by engagement with the limit switch 31, the carriage is returned to its upper position as limited by the limit switch 30. Simultaneously with the re-establishment of the normal electrical discharge machining conditions, the numerical control NC is automatically re-started and the programmed path data information processed by the numerical control NC, the processor 21 and the interpolator 20 is resumed such as to continue the cut 22 in the workpiece 2 according to the predetermined program from the point 40 on.

It will be appreciated that the wire trimming relative position 41 may be any relative position between the wire guide and support members 6 and 7 and the workpiece 2 wherein the longitudinal axis of the electrode wire 1 is disposed outside of the area of the workpiece 2. This position may be reached either by displacing the wire support and guide members 6–7, or by displacing the workpiece 2, or by displacing both.

It will be further appreciated that the rapid approach from the pre-drilled hole 23 in the workpiece 2 through the previously cut path 22 to the point 40 of prior rupture of the wire 1 is effected at a much faster rate than previously effected while cutting, in view of the voltage across the terminals of the pulse generator 3 disappearing from the line V, which permits the interpolator 20 to interpret and process the path point by point coordinate data for controlling the displacement servo motors Mx and My at maximum acceptable speed. In sophisticated numerical control systems, the point by point coordinate data, or the direction and distance data, supplied by an encoded perforated or magnetic tape, is stored in a buffer memory in which it remains until the end of a machining operation. In such systems, it is therefore not necessary to command the tape transport to rewind the tape to the beginning of the program for effecting the approach pass through the already cut path 22 in the workpiece 2, the necessary information data being extracted from the memory by the processor 21 for feeding into the interpolator 20 from the beginning of the stored program corresponding to the coordinates of the pre-drilled hole 23 to the point 40 of rupture of the wire 1, prior to starting the numerical control NC. In less sophisticated numerical control systems not provided with a high capacity buffer memory unit, the tape transport rewinds the tape to the beginning of the machining program, when the cut in the workpiece 2 is automatically stopped upon detection of the rupture of the electrode wire 1.

It will further be appreciated that the present invention may be used with different automatic wire threading devices, and is not limited to the particular configuration of return path illustrated in the drawing.

The sequence of steps can be changed for example at the relative trimming position 41 of the wire 1 and workpiece 2 at which the wire end is cut off. In this position, the calculator circuit 39 can be adapted to control the down stroke of the carriage 24 such as to advance the wire 1 until its end is engaged into the bands conveyor 8–9 and to subsequently command the cutting-off of the wire 1 by the movable knife 35 operated by the servo motor 36. In this manner, the container 42 may be omitted, as the conveyor bands 8–9 carry the end of the wire for disposal away from the machining zone. With such an arrangement, it is convenient to provide a funnel-shaped tubular member supported by the lower electrode wire support and guiding member 7 to direct the end of the wire 1 in an appropriate direction to facilitate engagement of the wire end into the wire conveyor mechanism.

Having thus described the present invention by way of an example of the best mode contemplated at the present for practicing the invention, modifications thereof being apparent to those skilled in the art, what is claimed as new is as follows:

1. An EDM apparatus for cutting by electrical discharges an electrode workpiece by means of an electrode tool in the form of an axially traveling wire, said apparatus comprising means for threading an end of said wire through a hole pre-drilled through the workpiece, wire feeding means grasping the end of said wire and drawing said wire axially through a machining zone between said wire and said workpiece, at least two servo motors for displacing said wire and said workpiece transversely relative to each other according to a programmed cutting path, memory means for storing data representing the relative position of said wire and said workpiece corresponding to the threading of said wire through said pre-drilled hole and for storing data representing the relative position of said wire and said workpiece at any instant said wire ruptures in the course of a cutting operation, means for detecting rupture of said wire, means for determining a return path for said wire and said workpiece to said threading relative position permitting rethreading said wire through said pre-drilled hole whereby said return path passes through an intermediate point wherein said wire is positioned exteriorly to the surface of said workpiece, means for returning said wire and said workpiece through said return path through said intermediate point to said threading relative position permitting rethreading said wire through said pre-drilled hole, means cutting off said wire proximate its end at said intermediate point of said return path wherein said cut-off wire portion is discarded exteriorly to the surface of said workpiece, means for rapidly returning said wire and said workpiece through said cutting path to their relative position at the instant said wire rupture was detected, and means for cutting off electrical discharges between said wire and said workpiece from the instant of said wire rupture until said wire and said workpiece are returned to said wire rupture relative position.

2. The apparatus of claim 1 wherein said wire is grasped at its end by said wire feeding means at said intermediate point of the return path, and further comprising means for operating said means cutting off said wire at said predetermined point.

3. The apparatus of claim 1 further comprising a disposal receptacle at said intermediate point for recovering the cut-off end of said wire, and means for operating said means cutting off said wire at said intermediate point.

4. An EDM process for cutting a workpiece by a traveling wire electrode comprising threading said wire electrode through a hole pre-drilled in said workpiece prior to effecting a cutting pass in said workpiece, grasping the end of said wire passed through said hole in conveyor means for feeding said wire longitudinally, applying electrical machining pulses across a machining zone between said wire and said workpiece, transversely displacing said wire and said workpiece relative to each other for effecting a cut in said workpiece along a pre-programmed path, detecting rupture of said wire when occurring at any point of said cutting path, cutting off said machining pulses upon detection of said wire rupture, returning said wire and said workpiece from the position of wire rupture to their initial relative position corresponding to the location of said pre-drilled hole in said workpiece by passing through an intermediate position wherein the end of said wire is suspended outside the area of said workpiece, cutting off the end of said wire at said intermediate position, rethreading the end of said wire at said initial relative position through said pre-drilled hole, grasping the end of said wire and entraining said wire by means of a feeding mechanism for longitudinal feed through the machining zone between said wire and said workpiece, returning said wire and said workpiece through the previously cut path to the point of wire rupture, and starting said cutting operation from said point of rupture by re-establishing electrical discharges across said machining zone and by displacing said wire and said workpiece relative to each other according to said pre-programmed cutting pass from said point of rupture on.

5. The process of claim 4 further comprising recovering the cut-off end of said wire in a disposal receptacle at said intermediate position.

6. The process of claim 4 further comprising automatically grasping the end of said wire and introducing it into said conveyor means at said intermediate position prior to cutting off said wire.

* * * * *